United States Patent
Harita et al.

(10) Patent No.: US 7,757,337 B2
(45) Date of Patent: Jul. 20, 2010

(54) VEHICLE WIPER DEVICE

(75) Inventors: Yasuhiro Harita, Kosai (JP); Yoshito Hirota, Iwata (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 931 days.

(21) Appl. No.: 11/590,787

(22) Filed: Nov. 1, 2006

(65) Prior Publication Data

US 2007/0143947 A1    Jun. 28, 2007

(30) Foreign Application Priority Data

Nov. 1, 2005    (JP)    ............... 2005-318733

(51) Int. Cl.
*B60S 1/46*    (2006.01)
*B60S 1/40*    (2006.01)
*B60S 1/52*    (2006.01)

(52) U.S. Cl. .............. 15/250.04; 15/250.201; 15/250.32

(58) Field of Classification Search .............. 15/250.01, 15/250.04, 250.32, 250.361, 250.351, 250.201
See application file for complete search history.

(56) References Cited

U.S. PATENT DOCUMENTS

| | | | | |
|---|---|---|---|---|
| 3,440,678 A | * | 4/1969 | Tibbet ............... | 15/250.04 |
| 3,854,161 A | * | 12/1974 | Benson ............... | 15/250.04 |
| 5,245,720 A | | 9/1993 | Schon | |
| 5,383,602 A | | 1/1995 | Edele et al. | |
| 5,724,699 A | * | 3/1998 | Bexten ............... | 15/250.04 |
| 5,987,695 A | * | 11/1999 | Edele et al. ........... | 15/250.04 |
| 6,463,621 B1 | * | 10/2002 | Zimmer et al. ........ | 15/250.04 |
| 6,499,179 B1 | * | 12/2002 | Fink et al. ............ | 15/250.04 |
| 6,513,185 B1 | * | 2/2003 | Zimmer et al. ........ | 15/250.04 |
| 2005/0166349 A1 | | 9/2005 | Nakano et al. | |

FOREIGN PATENT DOCUMENTS

| | | | |
|---|---|---|---|
| EP | 1 099 609 | | 5/2001 |
| JP | 54-180541 | | 12/1979 |
| JP | 57-147946 | * | 9/1982 |
| JP | 2-132566 | | 11/1990 |
| JP | 04-345561 | * | 12/1992 |

* cited by examiner

*Primary Examiner*—Gary K Graham
(74) *Attorney, Agent, or Firm*—Pearl Cohen Zedek Latzer, LLP (57) ABSTRACT

A pipe member is arranged along a wiper arm. A wiper blade has a lever rotatably coupled to the wiper arm and a blade rubber for wiping a surface to be wiped. A nozzle mechanism has an attachment member attached to the wiper arm, a nozzle member for supplying the washer liquid sent under pressure from the pipe member to the surface to be wiped, and an engaging portion provided in the nozzle member. The attachment member rotatably supports the nozzle member. The engaging portion engages with the wiper blade such that the nozzle member follows rotation of the wiper blade. Therefore, a vehicle wiper device facilitates replacement of the wiper blade, and allows washer liquid to be stably received by the surface to be wiped.

13 Claims, 7 Drawing Sheets

Fig.1

Fig. 2A Plan View

Fig. 2B Vehicle Forward Side

Fig. 2C Vehicle Rearward Side

VEHICLE WIPER DEVICE

CROSS-REFERENCE TO RELATED APPLICATIONS

This application claims priority from Japanese application 2005-318733, filed on Nov. 1, 2005, incorporated by reference herein in its entirety.

FIELD OF THE INVENTION

The present invention relates to a vehicle wiper device that wipes a surface to be wiped of a vehicle window glass and supplies washer liquid to the surface to be wiped.

BACKGROUND OF THE INVENTION

Typically, when a wiper blade wipes to wipe dirt from a vehicle window glass, a washing device supplies washer liquid to the surface to be wiped. For example, a wiper device disclosed in Japanese Laid-Open Utility Model Publication No. 54-180541 includes a wiper arm to which a rigid pipe is attached, which properly supplies washer liquid to a surface to be wiped. On an outer side of a wiper blade that is rotatably supported by the wiper arm, the rigid pipe is arranged to extend along the longitudinal direction of the wiper blade. The rigid pipe has a number of spray holes for spraying washer liquid to the surface to be wiped at close range. The wiper blade follows the curved shape of the surface to be wiped.

However, in the above configuration, it is difficult to cause the rigid pipe attached to the wiper arm to follow the curved shape of the surface to be wiped. Therefore, when the wiper blade wipes the surface to be wiped, the distance between the surface to be wiped and the spray holes, the spraying angle of the spray holes in relation to the surface to be wiped vary. Washer liquid sprayed from the spray holes cannot be stably received by the surface to be wiped.

In a configuration where a washer nozzle is simply attached to a wiper blade so as to follow a curved shape of a surface to be wiped, the washer nozzle must be removed from a hose extending from the vehicle body when the wiper blade is replaced. This complicates the replacement of the wiper blade.

It is an objective of the present invention to provide a vehicle wiper device that facilitates replacement of a wiper blade, and allows washer liquid to be stably received by a surface to be wiped.

SUMMARY OF THE INVENTION

According to one aspect of the invention, a vehicle wiper device for wiping a surface to be wiped of a vehicle is provided. A pipe member supplying washer liquid extends from the vehicle. The pipe member is arranged along a wiper arm. A wiper blade has a lever rotatably coupled to the wiper arm and a blade rubber for wiping the surface to be wiped. The lever includes at least one lever member for holding the blade rubber. A nozzle mechanism has an attachment member attached to the wiper arm, a nozzle member for supplying the washer liquid sent under pressure from the pipe member to the surface to be wiped, and an engaging portion provided in the nozzle member. The attachment member rotatably supports the nozzle member. The engaging portion engages with the wiper blade such that the nozzle member follows rotation of the wiper blade.

The wiper blade may further include a cover attached to the lever. The cover may have an opening facing the blade rubber and the cover may accommodate at least part of the lever from the opening. The engaging portion may engage with at least one of the cover and the lever.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will now be described with reference to FIGS. 1 to 8.

Figure 1:
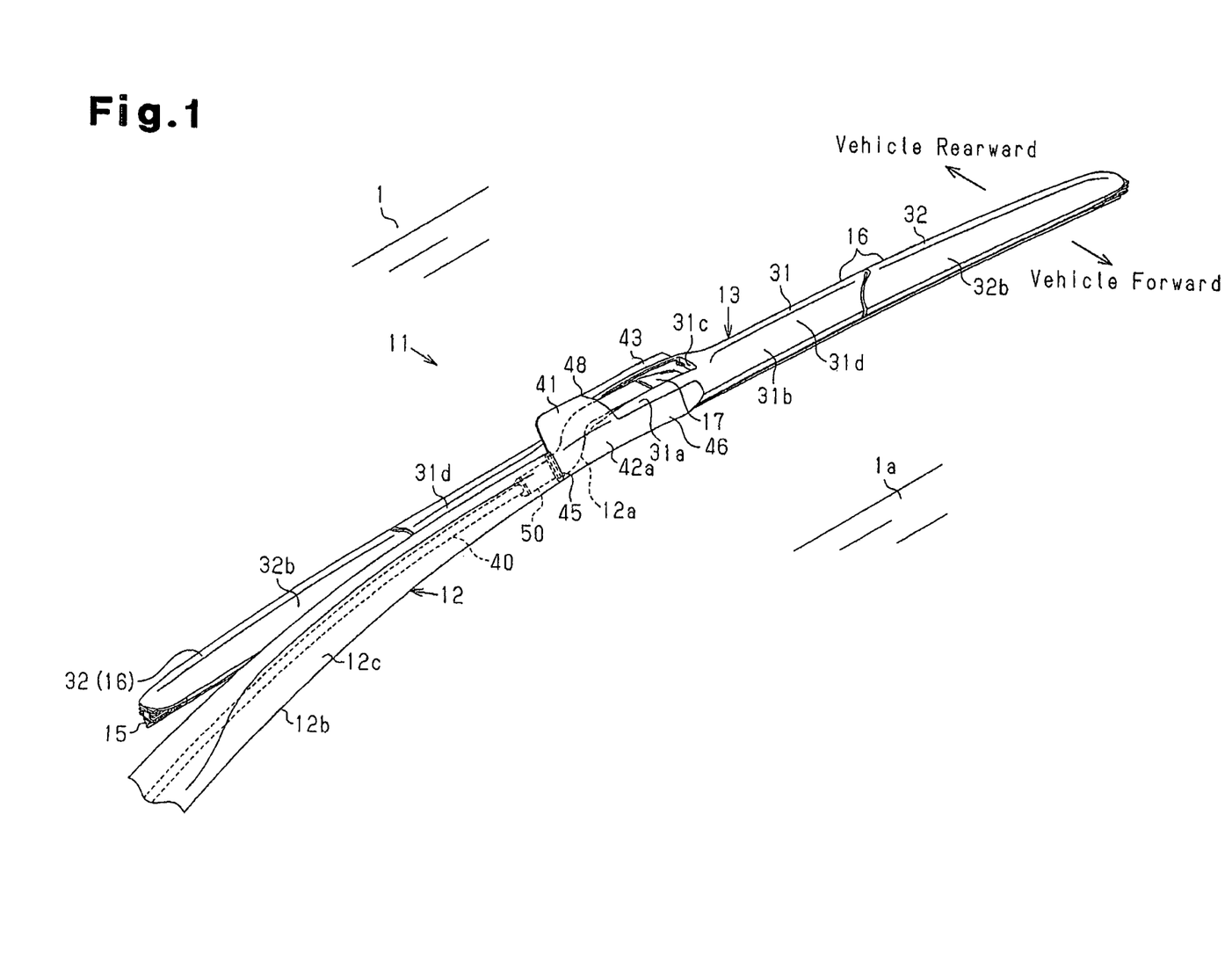
FIG. 1 is a perspective view illustrating a vehicle wiper device according to one embodiment of the present invention.

A vehicle wiper device 11 shown in FIG. 1 wipes dirt and rain droplets from a surface to be wiped 1a of a vehicle windshield 1.

Figure 8:
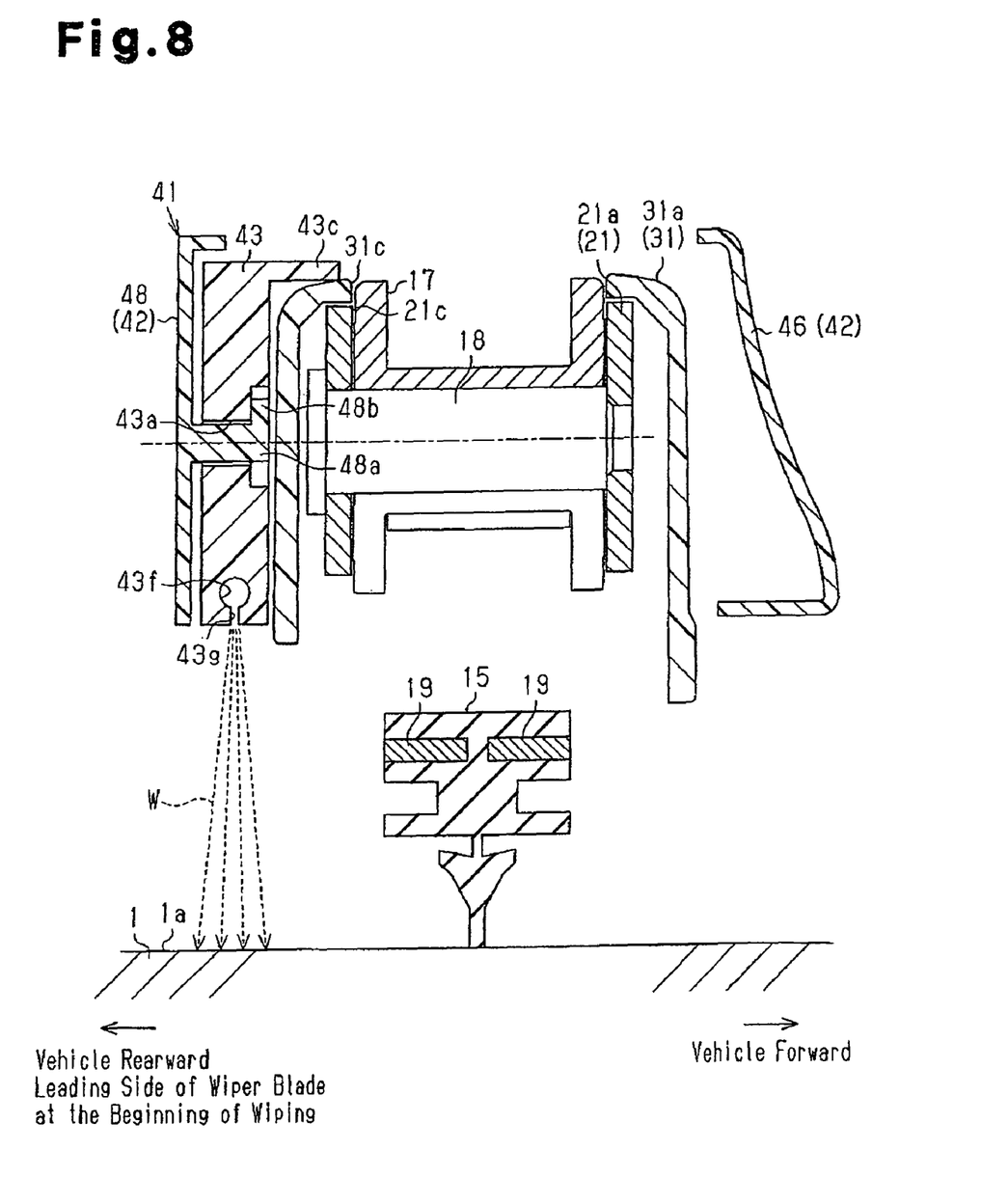
FIG. 8 is a transverse cross-sectional view illustrating the wiper blade shown in FIG. 1.

The vehicle wiper device 11 includes a wiper arm 12, wiper blade 13, and a nozzle mechanism 41 attached to the wiper arm 12. A proximal end of the wiper arm 12 is coupled to a pivot shaft (not shown), which is caused to reciprocate in a predetermined angle range by drive force of a wiper motor (not shown). The wiper blade 13 is rotatably coupled to a distal end of the wiper arm 12. The wiper blade 13 is rotatable about a rotation axis L that extends along the surface to be wiped 1a. The rotation axis L is shown in FIG. 8. A spring (not shown) for pressing the wiper blade 13 against the surface to be wiped 1a is attached to the wiper arm 12 shown in FIG. 1. As the pivot shaft rotates in a reciprocating manner, the wiper arm 12 is caused to pivot in a reciprocating manner, so that the wiper blade 13 wipes the surface to be wiped 1a.

Figure 3:
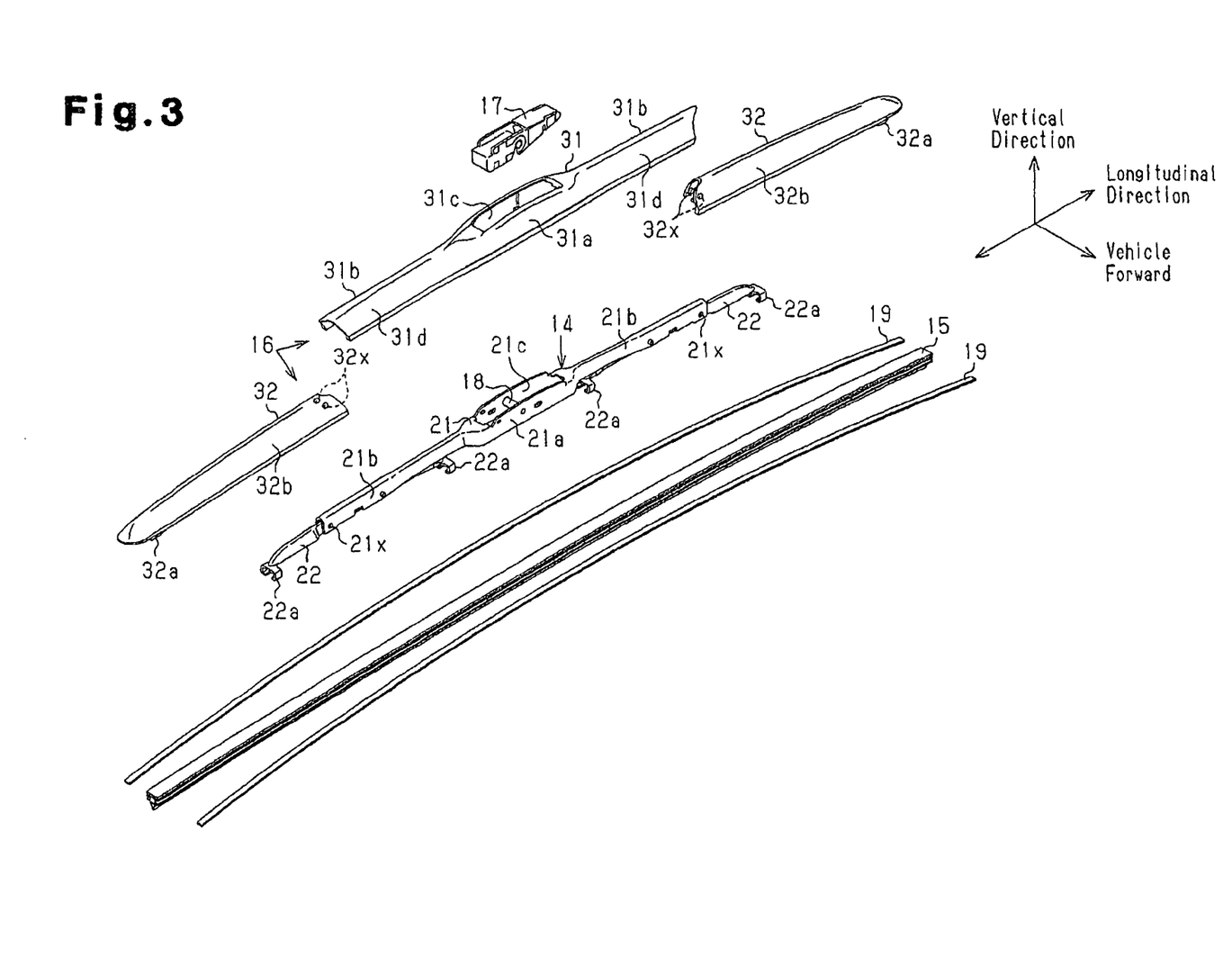
FIG. 3 is an exploded perspective view illustrating the wiper blade shown in FIG. 1.

As shown in FIG. 3, the wiper blade 13 includes a lever assembly 14, a blade rubber 15, a cover 16, and a coupling member 17.

The lever assembly 14, which serves as a lever, includes a primary lever 21 and two secondary levers 22, each coupled to one end of the primary lever 21. The primary lever 21 and the secondary levers 22 are assembled to form a tournament chart-like structure, that is, hierarchical structure. The primary lever 21 and the secondary levers 22 are lever members formed by pressing metal plate material.

The primary lever 21 has a holder portion 21a located at a center and two arm portions 21b extending in the longitudinal direction from the holder portion 21a. The holder portion 21a has a rectangular opening 21c that opens upward. The holder portion 21a includes a pair of parallel sidewalls to define the opening 21c. A coupler pin 18 extends between the sidewalls and through the opening 21c. The opening 21c receives the coupling member 17. The coupling member 17 is rotatably attached to the coupler pin 18 so as to be rotatably supported in the holder portion 21a. The distal end of the wiper arm 12 is inserted into the opening 21c, and detachably connected to the coupling member 17. The primary lever 21 is rotatable relative to the wiper arm 12 about the coupler pin 18, which extends in a direction perpendicular to the longitudinal direction of the wiper arm 12. As viewed in a direction perpendicular to the longitudinal direction, or in a lateral cross-sectional view, each arm portion 21b has an inverted U-shape opened to the surface to be wiped 1a. That is, each arm portion 21b has a mountain-folded shape.

Like the arm portions 21b of the primary lever 21, the secondary levers 22 each have an inverted U-shaped cross-section opened to the surface to be wiped 1a. A central portion of each secondary lever 22 is rotatably coupled to each end of the primary lever 21, or to the distal end of each arm portion 21b. Each secondary lever 22 is rotatable relative to the primary lever 21 about a rotation axis that extends in a direction perpendicular to the longitudinal direction of the primary lever 21. A holding portion 22a for holding the blade rubber 15 is formed at each end of each secondary lever 22. Each holding portion 22a is shaped like a channel with an opening toward the surface to be wiped 1a, and has hook shaped distal ends that are bent inward. The lever assembly 14 has four holding portions 22a for holding the blade rubber 15 at positions spaced at predetermined intervals along the longitudinal direction.

The blade rubber 15 for wiping the surface to be wiped 1a has an elongated shape. A pair of elongated backings 19 are attached to the blade rubber 15 along the longitudinal direction of the blade rubber 15. The backings 19 disperse, along the longitudinal direction, pressing force that is applied to the blade rubber 15 from the holding portions 22a to urge the blade rubber 15 toward the surface to be wiped 1a. In order that the blade rubber 15 reliably follows the surface to be wiped 1a, the backings 19 has a curved shape to correspond to the curved shape of the surface to be wiped 1a. Each backing 19 has different radii of curvature at different sections so that the radii o curvature changes along the longitudinal direction.

Figure 2A:
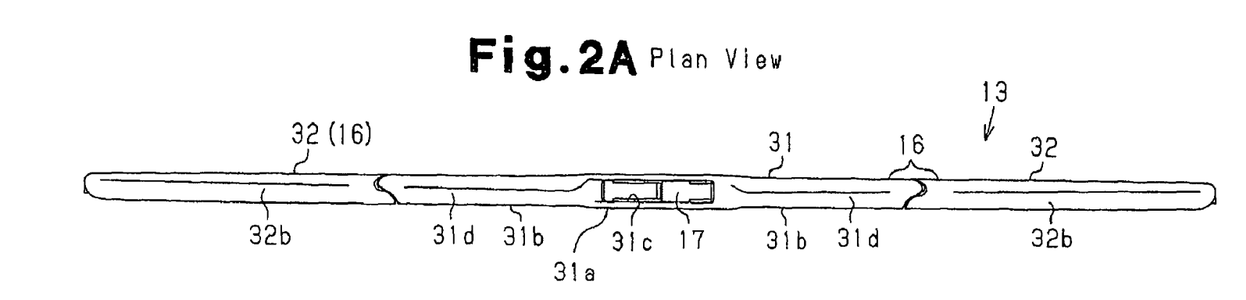
FIG. 2A is a plan view illustrating the wiper blade shown in FIG. 1.
Figure 2B:
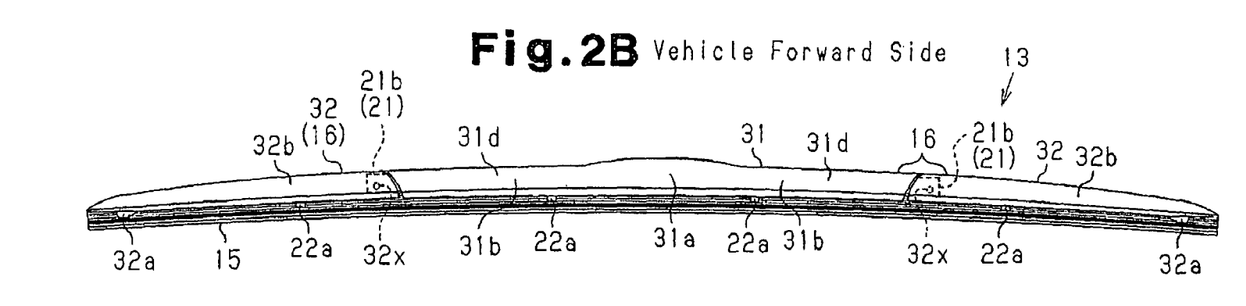
FIG. 2B is a front view illustrating the wiper blade shown in FIG. 1.
Figure 2C:
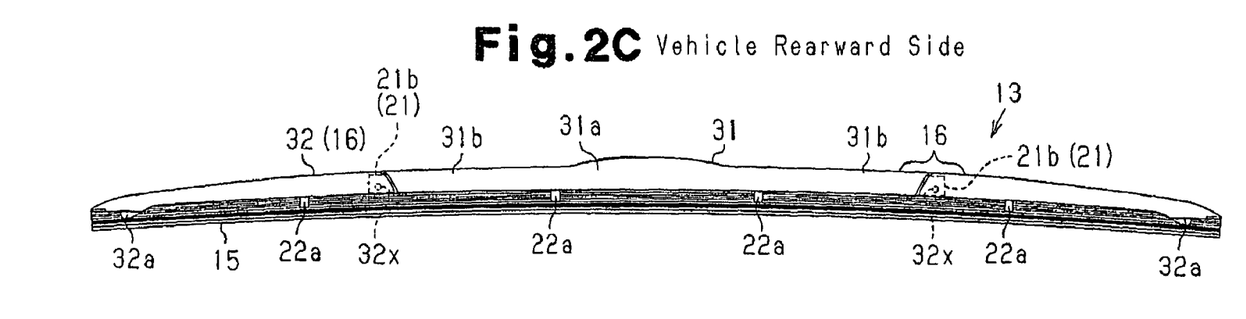
FIG. 2C is a rear view illustrating the wiper blade shown in FIG. 1.

As shown in FIGS. 1 to 3, the cover 16 covers the lever assembly 14 and the blade rubber 15 over the entire length. The cover 16 includes a center cover 31 and two side covers 32, each located on a side of the center cover 31. The center cover 31 and the side covers 32 are made of a resin material and have a predetermined rigidity.

The center cover 31 serving as a fixed cover is attached to and covers the primary lever 21. The center cover 31 has a holder accommodating portion 31a at a center and a pair of arm accommodating portions 31b extending in the longitudinal direction from the ends of the holder accommodating portion 31a. The holder accommodating portion 31a accommodates the holder portion 21a of the primary lever 21. The holder accommodating portion 31a has an opening 31c that corresponds to the opening 21c of the holder portion 21a. The opening 31c receives the distal end of the wiper arm 12. As viewed in a direction perpendicular to the longitudinal direction, or in a lateral cross-sectional view, each arm accommodating portion 31b has an inverted U-shape opened to the surface to be wiped 1a.

The proximal end of each side cover 32, which serves as a movable cover, is rotatably supported by an end of the primary lever 21, or by the distal end of the corresponding arm portion 21b. A coupler pins 32x are provided the inner side of the proximal end of each side cover 32. Coupler holes 21x are formed in each end of the primary lever 21. The coupler pins 32x are received by the coupler holes 21x, so that the side covers 32 are rotatable relative to the primary lever 21. As the arm accommodating portions 31b of the center cover 31, each side cover 32 has an inverted U-shaped cross-section. The apex of each side cover 32 becomes lower from the proximal end toward the distal end.

Each side cover 32 covers the corresponding secondary lever 22, and a portion of the blade rubber 15 that extends from the secondary lever 22. A holding portion 32a is formed at the distal end of each side covers 32 to hold the corresponding distal end of the blade rubber 15. The holding portions 32a are similar to the holding portions of the secondary levers 22. Each side cover 32 is rotatable about the corresponding coupler pins 32x, which extend in a direction perpendicular to the longitudinal direction of the primary lever 21. Therefore, when a portion of the blade rubber 15 that extends further from the distal end of one of the secondary lever 22 is bent, the corresponding side cover 32 is rotated to following the bending of the blade rubber 15.

A fin portion 31d is formed in each arm accommodating portion 31b of the center cover 31. The fin portion 31d extends over the entire length of the arm accommodating portion 31b. Likewise, a fin portion 32b is formed in a wall of each side cover 32 that faces forward in the vehicle. The fin portion 32b extends over the entire length of the side cover 32. The fin portions 31d, 32b receive relative wind generated when the vehicle is traveling, so that a force pressing the blade rubber 15 against the surface to be wiped 1a is generated.

Figure 4:
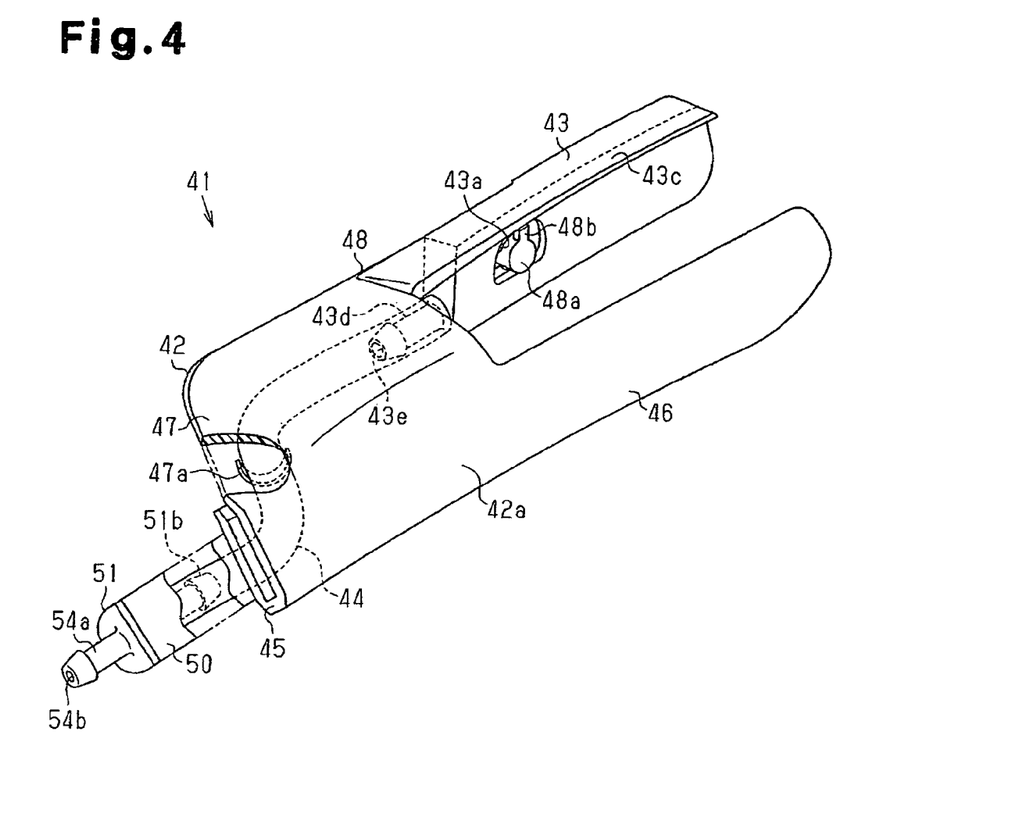
FIG. 4 is a perspective view illustrating the nozzle mechanism shown in FIG. 1.
Figure 6:
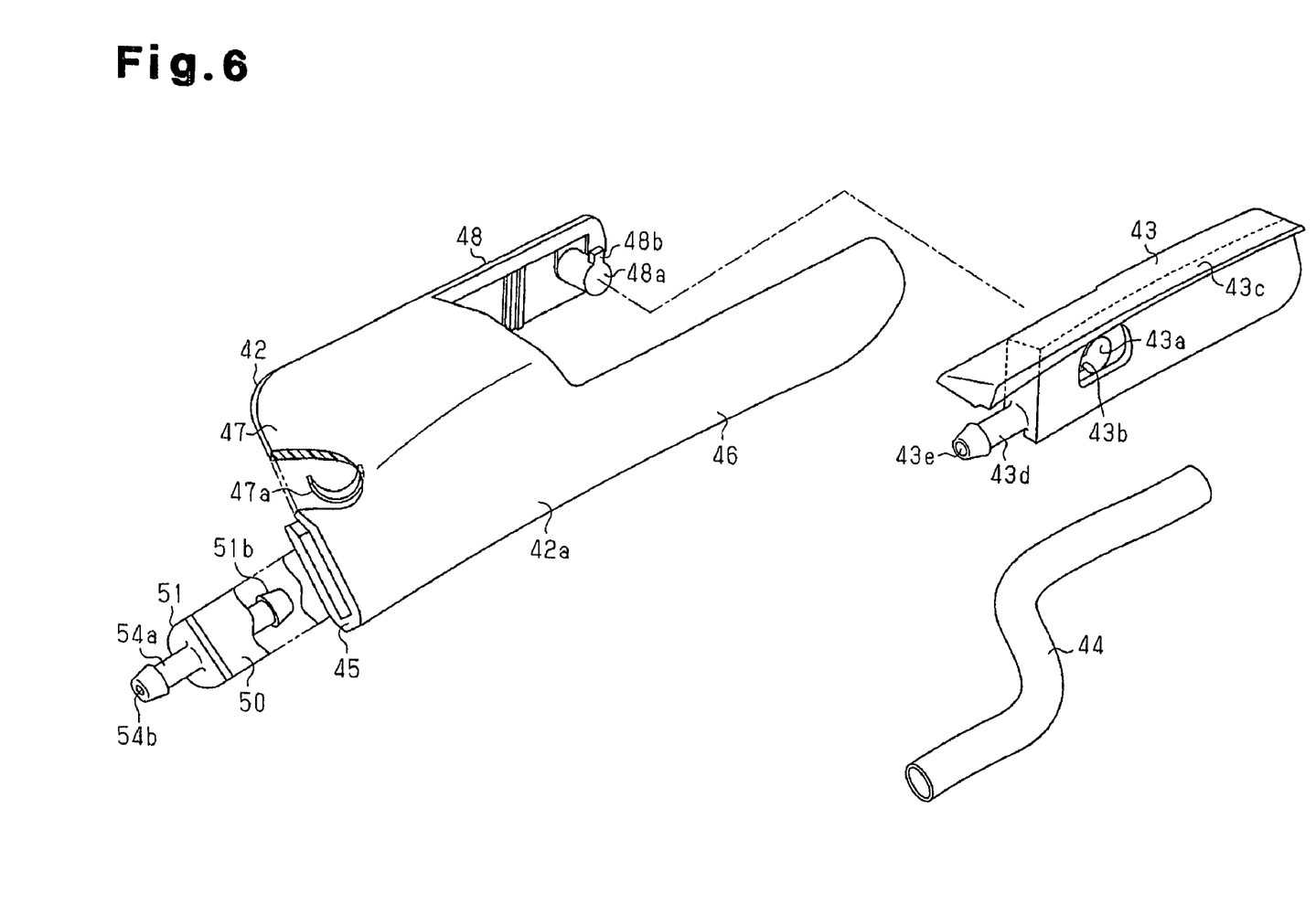
FIG. 6 is an exploded perspective view illustrating the nozzle mechanism shown in FIG. 4.

As shown in FIG. 1, a nozzle mechanism 41, functioning as a washer nozzle for spraying washer liquid W onto the surface to be wiped 1a, is provide in a center of the wiper blade 13. The nozzle mechanism 41 is attached to the distal end of the wiper arm 12. As shown in FIGS. 4 and 6, the nozzle mechanism 41 includes an attachment member 42, a nozzle member 43, and a connecting hose 44. The attachment member 42 attaches the nozzle member 43 to the wiper arm 12. The connecting hose 44 connects the passage in the nozzle member 43 to the passage in the attachment member 42.

As shown in FIG. 1, the wiper arm 12 includes a retainer 12b and a plate-like arm piece 12a fixed to the distal end of the retainer 12b. The proximal end the retainer 12b is rotatably coupled to an arm head (not shown) fixed to the pivot shaft. A side portion of the retainer 12b that faces forward in the vehicle functions as a fin portion 12c. The fin portion 12c receives relative wind of the vehicle so that a force pressing the blade rubber 15 against the surface to be wiped 1a is generated.

As shown in FIG. 4, the resin attachment member 42 includes a crimp portion 45, a front arm 46, a rear arm 48, and a coupling portion 47. The crimp portion 45 is shaped like a channel, and crimps the arm piece 12a in the direction of thickness. That is, the crimp portion 45 is detachably attached to the arm piece 12a.

As shown in FIG. 1, the front arm 46 extends toward the wiper blade 13 from the crimp portion 45. That is, the front arm 46 extends from the crimp portion 45 in a direction opposite from the wiper arm 12. The front arm 46 faces a side of the holder accommodating portion 31a that faces forward in the vehicle. A fin portion 42a is formed on the front arm 46 and the crimp portion 45. The fin portion 42a has the same function as the fin portion 12c of the wiper arm 12. The fin portion 42a is continuously formed with the fin portion 12c of the retainer 12b.

As shown in FIG. 1, the coupling portion 47 extends from the crimp portion 45 and entirely covers a center portion of the center cover 31. As shown in FIG. 4, the coupling portion 47 has in it a support ring 47a for supporting the connecting hose 44. The support ring 47a arranges the connecting hose 44 such that the connecting hose 44 does not interfere with the wiper blade 13.

As shown in FIG. 6, the rear arm 48 faces a side of the holder accommodating portion 31a that faces rearward in the vehicle. The rear arm 48 extends from the coupling portion 47 toward the distal end of the wiper blade 13, that is, in a direction away from the wiper arm 12.

As shown in FIG. 6, the rear arm 48 has a columnar support shaft 48a that extends in a direction perpendicular to the longitudinal direction of the wiper blade 13. The distal end of the support shaft 48a has an engaging projection 48b that projects upward. As shown in FIG. 8, the support shaft 48a is coaxial with a rotary shaft of the wiper blade 13, that is, the coupler pin 18. The support shaft 48a serving as a rotary shaft rotatably supports the nozzle member 43 to the rear arm 48. In other words, the rotation axis L of the wiper blade 13 coincides with the rotation axis L of the nozzle member 43.

Figure 7:
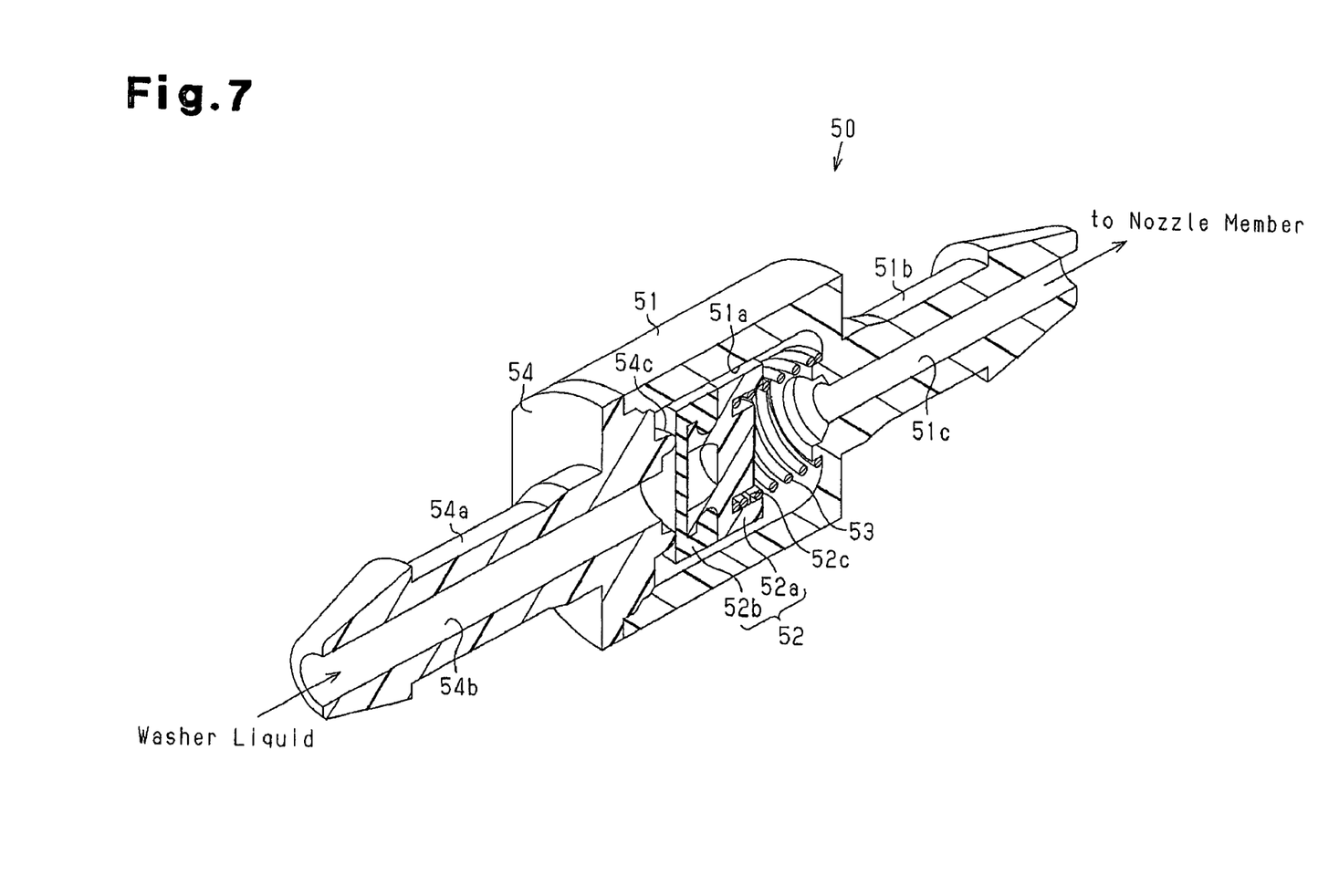
FIG. 7 is a cross-sectional perspective view illustrating the check valve shown in FIG. 6.

As shown in FIG. 4, the crimp portion 45 has a check valve 50 on a side opposite to the fin portion 42a. The check valve 50 includes a casing 51, which is formed as a cylinder with a bottom and integrally formed with a lower portion of the crimp portion 45. As shown in FIG. 7, an accommodation recess 51a of the casing 51 accommodates a valve body 52 and a coil spring 53.

The valve body 52 has a resin proximal portion 52a and a sealing portion 52b made of an elastic material such as rubber or elastomer. The disk-shaped sealing portion 52b is attached to the columnar proximal portion 52a. The proximal portion 52a has an annular seat groove 52c on a side opposite to the sealing portion 52b. The coil spring 53, which is a compression spring, has an end attached to the seat groove 52c and another end attached to the bottom of the casing 51. The diameter of the valve body 52 is less than the inner diameter of the accommodation recess 51a. The space between the inner wall of the accommodation recess 51a and the valve body 52 functions as a passage of the washer liquid W.

As shown in FIG. 7, a lid body 54 closes an opening of the casing 51. A cylindrical hose connector 54a extends from the lid body 54. An inlet passage 54b of the hose connector 54a introduces washer liquid W supplied by a washer pump mounted on the vehicle body to the accommodation recess 51a of the casing 51. The inlet passage 54b extends through a central portion of the lid body 54. The lid body 54 has an annular projection 54c provided about the opening of the inlet passage 54b. The outer diameter of the annular projection 54c is less than the outer diameter of the valve body 52. The urging force of the coil spring 53 presses the sealing portion 52b of the valve body 52 tightly against the annular projection 54c.

Figure 5:
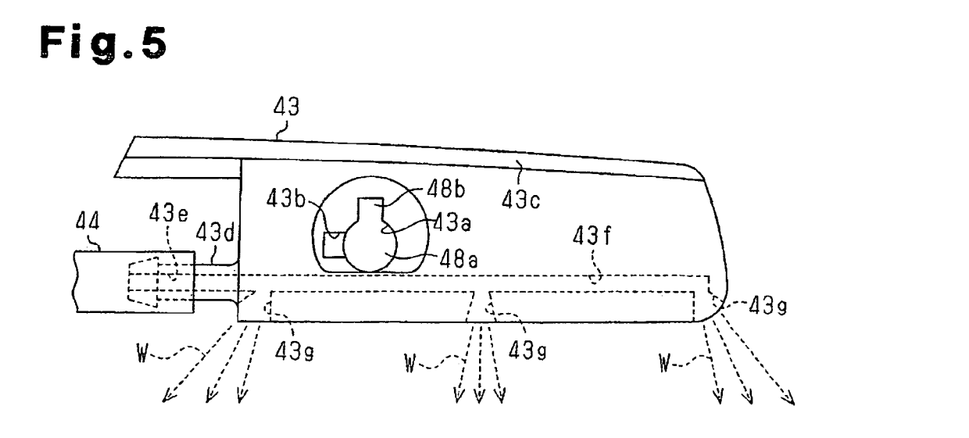
FIG. 5 is a partially enlarged side view illustrating the nozzle member shown in FIG. 4.

As shown in FIG. 7, the bottom of the casing 51 has an outlet connector 51b that extends in a direction opposite to the lid body 54. The outlet connector 51b is cylindrical and has an outlet passage 51c. After being introduced into the casing 51 through the inlet passage 54b, the washer liquid W passes through the outlet passage 51c and is discharged to the nozzle member 43. As shown in FIGS. 4 to 6, the connecting hose 44 has one end fitted to the outlet connector 51b and another end fitted to an inlet connector 43d of the nozzle member 43. The connecting hose 44 and a vehicle-side hose 40 are made of elastic material such as resin, rubber, or elastomer so that they are flexible.

As shown in FIG. 4, the nozzle member 43 is attached to the support shaft 48a of the rear arm 48. The resin nozzle member 43 is shaped as a rectangular parallelepiped. A insertion hole 43a is formed in the nozzle member 43. The support shaft 48a extends through the insertion hole 43a. As shown in FIG. 5, an allowance groove 43b is formed in the circumferential surface of the insertion hole 43a to permit the engaging projection 48b to be received in the insertion hole 43a.

When assembling the nozzle member 43 to the support shaft 48a, the nozzle member 43 is arranged to be perpendicular to the rear arm 48 so that the engaging projection 48b faces the allowance groove 43b. That is, the nozzle member 43 is arranged to extend vertically as viewed in FIG. 5. Then, the support shaft 48a is fully inserted into the insertion hole 43a while inserting the engaging projection 48b into the allowance groove 43b.

Subsequently, the nozzle member 43 is rotated by 90°, so that the nozzle member 43 is arranged to extend in the same direction as the rear arm 48. That is, the rear arm 48 is horizontalized as shown in FIG. 5. As a result, the nozzle member 43 is attached to the support shaft 48a. The engaging projection 48b engages with the edge of the insertion hole 43a with respect to the axial direction of the insertion hole 43a. Therefore, the engaging projection 48b rotatably install the nozzle member 43 to the support shaft 48a while preventing the nozzle member 43 from falling off the support shaft 48a. By a reverse procedure to installing of the nozzle member 43 to the support shaft 48a, the nozzle member 43 can be removed from the support shaft 48a.

As shown in FIG. 4, the nozzle member 43 has an engaging piece 43c at an upper portion. As shown in FIG. 8, the engaging piece 43c, which functions as an engaging portion, is placed at an edge of the opening 31c of the center cover 31. The engaging piece 43c extends along the longitudinal direction of the nozzle member 43. In other words, the engaging piece 43c extends in opposite directions in the longitudinal directions of the nozzle member 43 in relation to the insertion hole 43a and the support shaft 48a.

When the wiper blade 13 is rotated relative to the wiper arm 12, that is, when the center cover 31 is rotated relative to the wiper arm 12, the engaging piece 43c engages with the edge of the opening 31c of the center cover 31. That is, the center cover 31 urges the engaging piece 43c to rotate about the support shaft 48a. As a result, the nozzle member 43 is rotated together with the wiper blade 13 and the center cover 31.

As shown in FIG. 5, the proximal end of the nozzle member 43 has the inlet connector 43d that extends in a direction opposite from the insertion hole 43a. The cylindrical inlet connector 43d has an inlet passage 43e. The inlet connector 43d is connected to the connecting hose 44. The washer liquid W is introduced into the nozzle member 43 after passing through the check valve 50, the connecting hose 44, and the inlet passage 43e in this order. The nozzle member 43 has a supply passage 43f communicating with the inlet passage 43e. The supply passage 43f extends along the longitudinal direction of the nozzle member 43. The nozzle member 43 has three spray holes 43g on the bottom surface. On a surface of the nozzle member 43 that faces the surface to be wiped 1a, the spray holes 43g are located at three positions, or at ends and a center of the nozzle member 43. The supply passage 43f of the nozzle member 43 communicates with the spray holes 43g.

As shown in FIG. 1, the vehicle-side hose 40 is arranged on the lower surface of the wiper arm 12. The vehicle-side hose 40 is made of an elastic material such as resin, rubber, and elastomer. The vehicle-side hose 40 extends from the washer pump (not shown) mounted on the vehicle body, and is fitted to the hose connector 54a of the check valve 50.

When the washer pump is not operating and supply of washer liquid W is stopped, the urging force of the coil spring 53 presses the sealing portion 52b of the valve body 52 tightly against the annular projection 54c about the inlet passage 54b. That is, the check valve 50 is closed, and the inlet passage 54b is blocked. The washer liquid W is thus prevented from entering the accommodation recess 51a.

On the other hand, when the washer pump operates, and the washer liquid W passages through the vehicle-side hose 40 and is supplied to the check valve 50, the pressure of the washer liquid W acts against the urging force of the coil spring 53 and pushes the valve body 52, thereby opening the inlet passage 54b. This opens the check valve 50 and the washer liquid W is supplied to the nozzle member 43 through the accommodation recess 51a, the outlet passage 51c, and the connecting hose 44.

As shown in FIGS. 5 and 8, after being introduced into the nozzle member 43, the washer liquid W passes through the supply passage 43f and is sprayed onto the surface to be wiped 1a from the spray holes 43g.

When the vehicle wiper device 11 is not operating, the wiper blade 13 is located at the lower end of the windshield 1. In this state, the fin portions 31d, 32b of the cover 16 are located at the front edge of the wiper blade 13 in the vehicle. The nozzle mechanism 41 is located rearward in the vehicle of the wiper blade 13.

When the washer liquid W needs to be sprayed on to the surface to be wiped 1a, the washer pump draws the washer liquid W from a washer liquid tank mounted on the vehicle. The washer pump sends the washer liquid W under pressure from the vehicle-side hose 40 to the nozzle mechanism 41. The space ranging from the check valve 50 to the valve body 52, that is, the space including the interior of the vehicle-side hose 40 and the inlet passage 54b, is filled with the washer liquid W that was supplied from the washer pump in the previous spraying operation. Therefore, when the pressure of the washer liquid W is increased, the valve body 52 of the check valve 50 is immediately moved so that the check valve 50 is opened quickly. As a result, the washer liquid W is supplied to the nozzle member 43 through the connecting hose 44, and is readily sprayed from spray holes 43g. In response to the operation of the washer pump, the wiper blade 13 starts wiping operation.

At the beginning of the wiping operation of the wiper blade 13, the nozzle member 43 of the nozzle mechanism 41 is close to the surface to be wiped 1a. Thus, the washer liquid W is sprayed onto the surface to be wiped 1a at close range. As a result, the spraying path of the washer liquid W is prevented from being diverged by relative wind. In other words, unintended spraying of the washer liquid W to the outside of the windshield 1 due to relative wind is prevented. That is, the washer liquid is readily supplied to target points. Further, the nozzle member 43 is rearward in the vehicle of the wiper blade 13, that is, at a position located ahead of the blade rubber 15 at the start of wiping operation by the wiper blade 13. The nozzle member 43 supplies the washer liquid W. Thus, the surface to be wiped 1a is quickly cleaned. Further, the blade rubber 15 is prevented from sliding on the surface to be wiped 1a when the surface to be wiped 1a is dry.

The engaging piece 43c of the nozzle member 43 engages with the center cover 31 on the pivoting path of the center cover 31. Therefore, together with the rotation of the wiper blade 13, the nozzle member 43 rotates about the rotation axis L (the support shaft 48a), which is aligned with the rotation axis L (the coupler pin 18) of the wiper blade 13. Thus, when the wiper blade 13 rotates together with the wiper arm 12 while following the curved-shape of the surface to be wiped 1a, the nozzle member 43 rotates together with the wiper arm 12 while following the curved shape of the surface to be wiped 1a.

When the washer liquid W does not need to be sprayed onto the surface to be wiped 1a, the operation of the washer pump is stopped. As a result, the supply of washer liquid W to the nozzle mechanism 41 is stopped. Then, the pressure of the washer liquid W acting on the valve body 52 of the check valve 50 is lowered, and the urging force of the coil spring 53 presses the valve body 52 against the annular projection 54c about the inlet passage 54b. This blocks the inlet passage 54b. The washer liquid W is thus prevented from flowing into the accommodation recess 51a. As a result, the washer liquid W remains in the vehicle-side hose 40. The residual washer liquid W is thus prevented from leaking from the nozzle mechanism 41. The remaining washer liquid W will be readily sprayed from the spray holes 43g in the subsequent supply of the washer liquid W.

The present embodiment has the following advantages.

(1) The attachment member 42 of the nozzle mechanism 41 is attached to the wiper arm 12. The attachment member 42 rotatably supports the nozzle member 43 used for supplying the washer liquid W to the surface to be wiped 1a. The wiper blade 13 is attached to the wiper arm 12. The wiper blade 13 is replaced separately from the nozzle mechanism 41. Therefore, when the wiper blade 13 needs to be replaced, the vehicle-side hose 40 does not need to be removed from the nozzle mechanism 41. That is, the replacement can be completed simply by removing an old wiper blade 13 from the wiper arm 12 and attaching a new wiper blade 13 to the wiper arm 12. The replacement of the wiper blade 13 is thus easy.

The engaging piece 43c of the nozzle member 43 engages with the upper surface of the center cover 31 on the pivoting path of the center cover 31. As a result, the nozzle member 43 is rotated together with the wiper blade 13. The nozzle member 43 and the wiper blade 13 are rotated to follow the curved shape of the surface to be wiped 1a. Therefore, changes in the distance between the spray holes 43g of the nozzle member 43 and the surface to be wiped 1a are suppressed, so that, the direction of the spray holes 43g in relation to the surface to be wiped 1a is limited. Thus, the sprayed washer liquid W is stably received by the surface to be wiped 1a.

(2) The engaging piece 43c of the nozzle member 43 engages with the center cover 31. The nozzle member 43 is rotated together with the wiper blade 13. The center cover 31 has a predetermined rigidity. Therefore, the nozzle member 43 is permitted to reliably follow the wiper blade 13.

The engaging piece 43c of the nozzle member 43 engages with the upper surface of the center cover 31. The shape of the center cover 31 therefore does not need to be changed. Further, the nozzle mechanism 41 is easily attached to and removed from the wiper blade 13.

(3) The cover 16 improves the appearance of the wiper blade 13, which is located on the outer side of the vehicle. Further, the cover 16 has the fin portions 31d, 32b. The fin portions 31d, 32b receive relative wind of the vehicle and generate force that presses the wiper blade 13 and the blade rubber 15 against the surface to be wiped 1a. Therefore, the wiper blade 13 is prevented being separated from the surface to be wiped 1a.

(4) The support shaft 48a, which supports the nozzle member 43, is located on the same axis as the coupler pin 18. That is, the support shaft 48a, which is the rotary shaft of the nozzle member 43, is on the same axis as the coupler pin 18, which is the rotary shaft of the wiper blade 13. Therefore, when the nozzle member 43 is rotated together with the wiper blade 13, the nozzle member 43 and the wiper blade 13 are not twisted relative to each other due to displacement of rotation axes. That is, the nozzle member 43 is smoothly rotated.

(5) The engaging piece 43c extends from the support shaft 48a, which is the rotary shaft of the nozzle member 43, in opposite directions along the longitudinal direction of the nozzle member 43. Therefore, the engaging piece 43c engages with the wiper blade 13 both in the forward rotation and the reverse rotation of the wiper blade 13. Therefore, the nozzle member 43 readily follows the rotation of the wiper blade 13 in both directions.

(6) The attachment member 42 of the nozzle mechanism 41 is exposed to the outside in a state being attached to the wiper arm 12. The attachment member 42 includes the fin portion 42a. The fin portion 42a receives relative wind of the vehicle and generates force that presses the wiper blade 13 and the blade rubber 15 against the surface to be wiped 1a. The pressing force reaches the wiper blade 13 and the blade rubber 15 from the fin portion 42a through the wiper arm 12. Therefore, in cooperation with the fin portions 31d, 32b of the cover 16, the fin portion 42a prevents the wiper blade 13 from being separated from the surface to be wiped 1a.

(7) The nozzle mechanism 41 has the check valve 50. The check valve 50 allows the washer liquid W sent under pressure to flow into the nozzle member 43, and prevents the washer liquid W from flowing into the nozzle member 43 when the supply is stopped. Therefore, the washer liquid W remaining in the vehicle-side hose 40 is prevented from leaking. That is, leaked washer liquid W is prevented from staying on to the surface to be wiped 1a. When the supply of washer liquid W is stopped, centrifugal force generated by the wiping operation of the wiper blade 13 acts on the wiper liquid W remaining in the vehicle-side hose 40. In such a case, the washer liquid W is prevented from leaking.

(8) The check valve 50 includes the valve body 52, which opens and closes the inlet passage 54b, or a passage of the washer liquid W, and the coil spring 53, which urges the valve body 52 in a direction to close the inlet passage 54b. This stabilizes the pressure required for opening the check valve 50. That is, the check valve 50 is prevented from being accidentally opened.

(9) The attachment member 42 is spaced apart from the nozzle member 43 in the nozzle mechanism 41. The check valve 50 is provided in the attachment member 42. The check valve 50 is connected to the nozzle member 43 by the flexible connecting hose 44, which does not hamper desired rotation of the nozzle member 43. Therefore, while being provided with the check valve 50, the nozzle mechanism 41 is reduced in size. This adds to the flexibility of the arrangement of the nozzle member 43. Even if the wiper blade 13 is located on one edge, the size of the nozzle mechanism 41 is prevented from being increased.

(10) The nozzle member 43 of the nozzle mechanism 41 is detachably attached to the attachment member 42 of the nozzle mechanism 41. Thus, among the components of the nozzle mechanism 41, the replacement of only the nozzle member 43 is possible. The maintenance of the nozzle mechanism 41 is thus easy.

(11) The nozzle mechanism 41 can be detached from the wiper arm 12. Thus, the replacement of only the nozzle mechanism 41 is possible. This facilitates the maintenance of the nozzle mechanism 41. Also, the vehicle wiper device 11 is easily configured to have a specification with or without the nozzle mechanism 41. For example, the nozzle mechanism 41 may be an optional component that can be attached to the vehicle wiper device 11.

The above embodiments of the present invention may be modified as follows.

In the illustrated embodiments, the check valve 50 is attached to the attachment member 42, which is separated from the nozzle member 43. The connecting hose 44 connects the check valve 50 to the nozzle member 43. However, the check valve 50 may be provided in the nozzle member 43. In this case, the connecting hose 44 is omitted.

In the illustrated embodiments, the check valve 50 includes the valve body 52 and the coil spring 53. The configuration of the check valve 50 may be changed as necessary. For example, the check valve 50 may have an urging member other than the coil spring 53.

In the illustrated embodiments, the engaging piece 43c of the nozzle member 43 is located on the upper surface of the center cover 31 of the cover 16, so that the nozzle member 43 follows rotation of the wiper blade 13. This configuration may be changed. For example, an engaging portion of the nozzle member 43 and the cover 16 may be engaged by means of the engagement of projections and recesses, so that the nozzle member 43 is attached to the cover 16. An engaging portion of the nozzle member 43 may be engaged with the lever assembly 14.

In the illustrated embodiment, the cover 16 is formed by three parts, or the center cover 31 and the two side covers 32. However, the cover 16 may be formed by two or less parts or by four or more parts. The number of levers may be one.

The present invention may be applied to a vehicle wiper device from which the cover 16 is omitted. In this case, an engaging portion of the nozzle member 43 is engaged with the lever assembly 14.

The invention claimed is:

1. A vehicle wiper device for wiping a surface to be wiped of a vehicle, wherein a pipe member for supplying washer liquid extends from the vehicle, the wiper device comprising:
   a wiper arm, wherein the pipe member is arranged along the wiper arm;
   a wiper blade having a lever rotatably coupled to the wiper arm and a blade rubber for wiping the surface to be wiped, wherein the lever includes at least one lever member for holding the blade rubber; and
   a nozzle mechanism having an attachment member attached to the wiper arm, a nozzle member for supplying the washer liquid sent under pressure from the pipe member to the surface to be wiped, and an engaging portion provided in the nozzle member, wherein the attachment member rotatably supports the nozzle member, and where the engaging portion engages with the wiper blade such that the nozzle member follows rotation of the wiper blade.

2. The vehicle wiper device according to claim 1, wherein the engaging portion causes the nozzle member to engage with the lever.

3. The vehicle wiper device according to claim 1,
   wherein the wiper blade further includes a cover attached to the lever, the cover having an opening facing the blade rubber, wherein the cover accommodates at least part of the lever from the opening, and
   wherein the engaging portion engages with at least one of the cover and the lever.

4. The vehicle wiper device according to claim 3,
wherein the cover receives relative wind generated when the vehicle is traveling, and wherein the cover has a fin portion, wherein, when receiving the relative wind from a direction perpendicular to a longitudinal direction of the wiper blade, the fin portion generates a pressing force that presses the blade rubber against the surface to be wiped.

5. The vehicle wiper device according to claim 1, further comprising:
a first rotary shaft rotatably supporting the wiper blade to the wiper arm; and
a second rotary shaft rotatably supporting the nozzle member to the attachment member,
wherein the second rotary shaft and the first rotary shaft are coaxial with each other.

6. The vehicle wiper device according to claim 5,
wherein the engaging portion is located on both sides of the second rotary shaft in the longitudinal direction of the wiper blade.

7. The vehicle wiper device according to claim 1,
wherein the attachment member has a fin portion, wherein, when receiving relative wind generated when the vehicle is traveling, the fin portion generates a pressing force that is transmitted by the wiper arm and acts on the blade rubber, the pressing force presses the blade rubber against the surface to be wiped.

8. The vehicle wiper device according to claim 1,
wherein the nozzle mechanism has a washer liquid passage that reaches the nozzle member, and a valve that opens the passage when the washer liquid is being sent under pressure, and,
wherein, when the supply of the washer liquid is stopped, the valve closes the passage.

9. The vehicle wiper device according to claim 8,
wherein the valve includes a valve body for opening and closing the passage, and an urging member that urges the valve body in a direction to close the passage.

10. The vehicle wiper device according to claim 8, further comprising a flexible connecting pipe,
wherein the valve is located in the attachment member, the washer liquid being supplied to the valve from the pipe member, and
wherein the connecting pipe connects the valve to the nozzle member.

11. The vehicle wiper device according to claim 1,
wherein the nozzle member is detachably attached to the attachment member.

12. The vehicle wiper device according to claim 1,
wherein the nozzle member is detachably attached to the wiper arm.

13. A vehicle wiper device for wiping a surface to be wiped of a vehicle, wherein a pipe member for supplying washer liquid extends from the vehicle, the wiper device comprising:
a wiper arm, wherein the pipe member is arranged along the wiper arm;
a wiper blade having a lever rotatably coupled to the wiper arm, a blade rubber for wiping the surface to be wiped, and a cover having an opening that faces the blade rubber, wherein the lever includes at least one lever member for holding the blade rubber, and wherein the cover is attached to the lever so as to accommodating at least part of the lever from the opening; and
a nozzle mechanism having an attachment member attached to the wiper arm, a nozzle member for supplying the washer liquid sent under pressure from the pipe member to the surface to be wiped, and an engaging portion provided in the nozzle member, wherein the attachment member rotatably supports the nozzle member, and where the engaging portion engages with at least one of the cover and the lever such that the nozzle member follows rotation of the wiper blade.

* * * * *